(12) United States Patent
Takagi

(10) Patent No.: US 10,808,107 B2
(45) Date of Patent: Oct. 20, 2020

(54) RUBBER COMPOSITION FOR TIRE

(71) Applicant: The Yokohama Rubber Co., LTD., Minato-ku, Tokyo (JP)

(72) Inventor: Ryosuke Takagi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 20 days.

(21) Appl. No.: 16/310,392

(22) PCT Filed: Jun. 15, 2017

(86) PCT No.: PCT/JP2017/022195
§ 371 (c)(1),
(2) Date: Dec. 14, 2018

(87) PCT Pub. No.: WO2018/003526
PCT Pub. Date: Jan. 4, 2018

(65) Prior Publication Data
US 2019/0248990 A1 Aug. 15, 2019

(30) Foreign Application Priority Data
Jun. 27, 2016 (WO) .................. PCT/JP2016/069041

(51) Int. Cl.
*C08K 3/34* (2006.01)
*C08L 9/06* (2006.01)
(Continued)

(52) U.S. Cl.
CPC .............. *C08L 9/06* (2013.01); *B60C 1/0016* (2013.01); *B60C 1/0025* (2013.01);
(Continued)

(58) Field of Classification Search
None
See application file for complete search history.

(56) References Cited

U.S. PATENT DOCUMENTS 8,362,118 B2 * 1/2013 Mihara ................ B60C 1/0016
524/492
9,890,271 B2 * 2/2018 Miyazaki .................. C08L 9/06
(Continued)

FOREIGN PATENT DOCUMENTS

JP H04-300931 10/1992
JP 2006-293061 10/2006
(Continued)

OTHER PUBLICATIONS

Brochure for General Purpose Rubber, Nipol SBR, Zeon Corp., Japan, 2 pages, Downloaded on Feb. 29, 2020.*
(Continued)

*Primary Examiner* — Tae H Yoon
(74) *Attorney, Agent, or Firm* — Thorpe North & Western

(57) ABSTRACT

A rubber composition for a tire contains: per 100 parts by mass of a diene rubber containing 50 parts by mass or greater of an emulsion-polymerized styrene-butadiene rubber having a bonded styrene content of 30 mass % or less, from 20 to 40 parts by mass of a butadiene rubber, and WN parts by mass of a natural rubber, WT parts by mass of an aromatic modified terpene resin and WS parts by mass of a silica. A ratio (WN/WS) of a compounded amount of the natural rubber (WN) to a compounded amount of the silica (WS) is from 0.4 to 1.0, and a ratio (WS/WT) of the compounded amount of the silica (WS) to a compounded amount of the aromatic modified terpene resin (WT) is from 2.0 to 5.0.

4 Claims, 1 Drawing Sheet

(51) Int. Cl.
*C08L 7/00* (2006.01)
*B60C 1/00* (2006.01)
*B60C 11/00* (2006.01)
*C08L 53/02* (2006.01)

(52) U.S. Cl.
CPC ..... *B60C 11/0008* (2013.01); *C08L 2205/025* (2013.01); *C08L 2205/035* (2013.01)

(56) References Cited

U.S. PATENT DOCUMENTS

| | | | |
|---|---|---|---|
| 2011/0144236 A1 | 6/2011 | Mihara | |
| 2014/0171557 A1* | 6/2014 | Ringot | B60C 1/0016 524/83 |
| 2017/0152370 A1 | 6/2017 | Mihara | |

FOREIGN PATENT DOCUMENTS

| | | |
|---|---|---|
| JP | 2008-297493 | 12/2008 |
| JP | 2011-122057 | 6/2011 |
| JP | 2012-007145 | 1/2012 |
| JP | 2012-007145 A * | 1/2012 |
| JP | 2013-237724 | 11/2013 |
| JP | 2016-008285 | 1/2016 |
| WO | WO 2015/093316 | 6/2015 |
| WO | WO 2015/199223 | 12/2015 |

OTHER PUBLICATIONS

Brochure for SBR, NIPOL SBR, NIPOL SBR NS Series, Zeon Corp., Japan, 2 pages, Downloaded on Feb. 29, 2020.*
International Search Report for International Application No. PCT/JP2017/022195 dated Sep. 12, 2017, 4 pages, Japan.

* cited by examiner

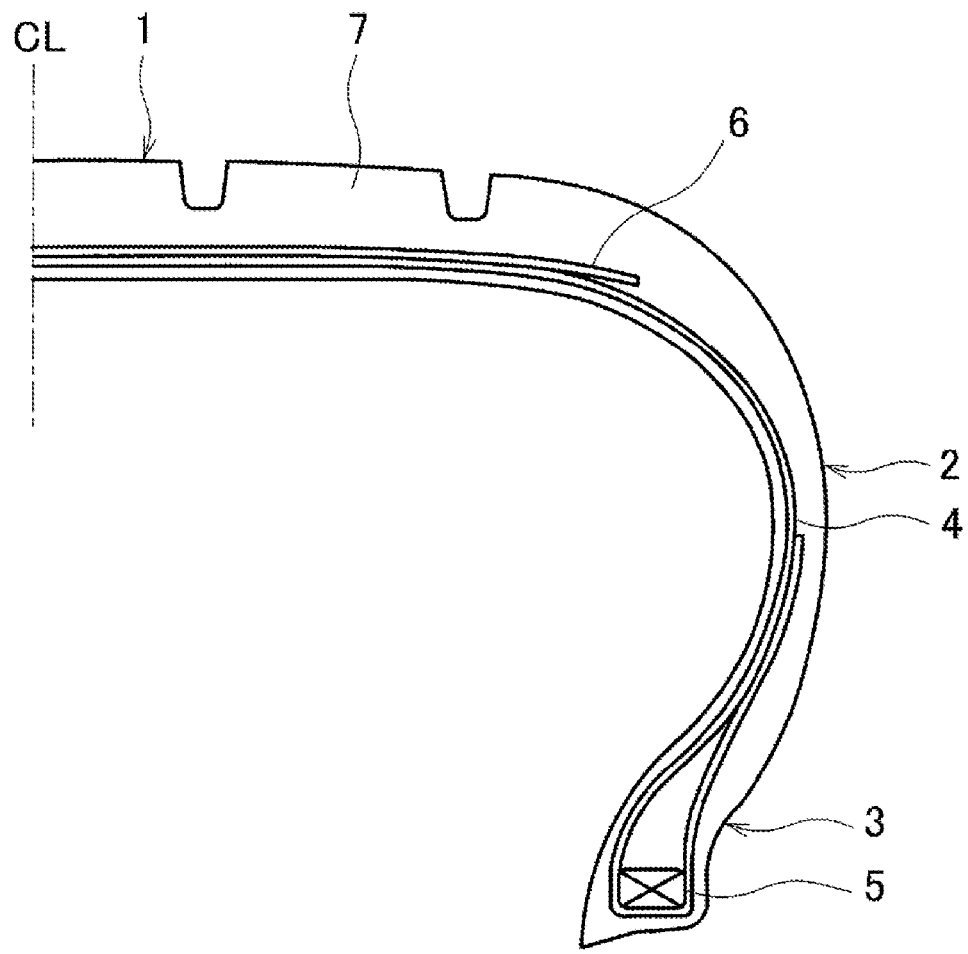

RUBBER COMPOSITION FOR TIRE

CROSS-REFERENCE TO RELATED APPLICATIONS

This application is a 371 National Stage Application, which claims the benefit of International Application No. PCT/JP2017/022195, filed on Jun. 15, 2017, which claims priority to Japanese Patent Application No. PCT/JP2016/006041, filed on Jun. 27, 2016, the contents of which are hereby incorporated by references in their entirety.

TECHNICAL FIELD

The present technology relates to a rubber composition for a tire that enhances wet grip performance, performance on snow, cut resistance, wear resistance, and the processability of a pneumatic tire.

BACKGROUND ART

Pneumatic tires for sport utility vehicles (SUV) and light trucks are required to have a variety of excellent performances, such as traveling properties and off-road durability (cut resistance); comfortability and quietness on road; performance on snow during travel on snowy road surfaces and wet grip performance and dry grip performance during travel on non-snow-covered road surfaces (wet road surfaces and dry road surfaces) to make it possible to use the tires for all seasons; and wear resistance.

International Patent Publication No. WO 2015/093316 proposes to enhance wet grip performance and wear resistance by a rubber composition for a tire containing an emulsion-polymerized styrene-butadiene rubber having 35 wt. % or greater of butadiene rubber and 35 wt. % or greater of bonded styrene content, and an aromatic modified terpene resin. However, with this rubber composition for a tire, performance on snow for traveling on snowy road surfaces and cut resistance are insufficient, and also the enhancement of the processability of the rubber composition is required.

Japan Unexamined Patent Publication No. 2013-237724 proposes to enhance grip performance and wear resistance by a rubber composition for a tire tread containing: per 100 parts by mass of a rubber component containing from 5 to 50 mass % of a modified conjugated diene copolymer and natural rubber and/or a diene synthetic rubber, from 60 to 140 parts by mass of a reinforcing filler containing from 50 to 95 mass % of silica and from 50 to 5 mass % of carbon black; and from 5 to 60 parts by mass of a resin. However, with this rubber composition for a tire tread, wet grip performance and performance on snow cannot be sufficiently enhanced, and cut resistance, wear resistance, and processability may be insufficient, and thus further enhancement has been required.

SUMMARY

The present technology provides a rubber composition for a tire that enhances performance on snow, cut resistance, wear resistance, and processability equal to or beyond conventional levels while the excellent wet grip performance of a pneumatic tire is ensured.

The rubber composition for a tire according to an embodiment of the present technology contains: per 100 parts by mass of a diene rubber containing 50 parts by mass or greater of an emulsion-polymerized styrene-butadiene rubber having a bonded styrene content of 30 mass % or less, from 20 to 40 parts by mass of a butadiene rubber, and WN parts by mass of a natural rubber, WT parts by mass of an aromatic modified terpene resin and WS parts by mass of a silica. A ratio (WN/WS) of a compounded amount of the natural rubber (WN) to a compounded amount of the silica (WS) is from 0.4 to 1.0, and a ratio (WS/WT) of the compounded amount of the silica (WS) to a compounded amount of the aromatic modified terpene resin (WT) is from 2.0 to 5.0.

According to the rubber composition for a tire according to an embodiment of the present technology, the rubber composition contains: per 100 parts by mass of a diene rubber containing 50 parts by mass or greater of an emulsion-polymerized styrene-butadiene rubber having a bonded styrene content of 30 mass % or less, from 20 to 40 parts by mass of a butadiene rubber, and WN parts by mass of a natural rubber, WT parts by mass of an aromatic modified terpene resin and WS parts by mass of a silica. A ratio (WN/WS) of a compounded amount of the natural rubber to a compounded amount of the silica is from 0.4 to 1.0, and a ratio (WS/WT) of the compounded amount of the silica to a compounded amount of the aromatic modified terpene resin is from 2.0 to 5.0. Therefore, when a pneumatic tire is formed, performance on snow, cut resistance, wear resistance, and processability can be enhanced equal to or beyond conventional levels while excellent wet grip performance is ensured.

The rubber composition for a tire according to an embodiment of the present technology further contains from 50 to 120 parts by mass of a filler per 100 parts by mass of the diene rubber, while the filler contains 10 mass % or greater of the silica, and a CTAB specific surface area of the silica is from 120 to 180 $m^2/g$.

A pneumatic tire containing the rubber composition for a tire according to an embodiment of the present technology can enhance performance on snow, cut resistance, and wear resistance while excellent wet grip performance is achieved. Furthermore, because production is performed by using the rubber composition for a tire having excellent processability, the tires having high quality described above can be obtained in a stable manner.

BRIEF DESCRIPTION OF DRAWINGS

FIG. 1 is a cross-sectional view in a tire meridian direction that illustrates an example of an embodiment of a pneumatic tire in which a rubber composition for a tire according to an embodiment of the present technology is used.

DETAILED DESCRIPTION

A pneumatic tire illustrated in FIG. 1 has a tread portion 1, a sidewall portion 2, and a bead portion 3. A carcass layer 4 is mounted between the left and right bead portions 3 and 3, and each end of the carcass layer 4 is folded over from the inside to the outside of the tire around a bead core 5. A belt layer 6 is disposed on the outer side in the tire radial direction of the carcass layer 4 in the tread portion 1, and a tread rubber 7 is disposed on the outside of the belt layer 6. The rubber composition for a tire according to an embodiment of the present technology can be advantageously used in the tread rubber 7 or the sidewall portion 2. Among these, application in the tread rubber 7 is particularly preferred.

In the rubber composition for a tire according to an embodiment of the present technology, the rubber component contains a diene rubber. It is necessary for the diene rubber to contain an emulsion-polymerized styrene-butadiene rubber having a bonded styrene content of 30 mass % or less, a butadiene rubber, and a natural rubber, and the total of these diene rubbers is 100 parts by mass.

Any butadiene rubber that is regularly used in rubber compositions for a tire can be used as the butadiene rubber. The content of the butadiene rubber is from 20 to 40 parts by mass, preferably from 24 to 38 parts by mass, and more preferably from 28 to 36 parts by mass, per 100 parts by mass of the diene rubber. When the content of the butadiene rubber is less than 20 parts by mass, performance on snow is deteriorated. When the content of the butadiene rubber is greater than 40 parts by mass, wet grip performance is deteriorated.

The inclusion of the emulsion-polymerized styrene-butadiene rubber having the bonded styrene content of 30 mass % or less can enhance performance on snow. Furthermore, excellent processability can be also achieved. The bonded styrene content of the emulsion-polymerized styrene-butadiene rubber is 30 mass % or less, and preferably from 20 to 28 mass %. When the bonded styrene content of the emulsion-polymerized styrene-butadiene rubber is greater than 30 mass %, performance on snow is deteriorated. Furthermore, processability tends to be deteriorated. In the present specification, the bonded styrene content is measured by infrared spectroscopy (the Hampton method).

The content of the emulsion-polymerized styrene-butadiene rubber is 50 parts by mass or greater, preferably from 52 to 64 parts by mass, and more preferably from 54 to 62 parts by mass, per 100 parts by mass of the diene rubber. When the content of the emulsion-polymerized styrene-butadiene rubber is less than 50 parts by mass, an effect of enhancing performance on snow cannot be sufficiently achieved.

Furthermore, the inclusion of the natural rubber can enhance wet grip performance. In the present specification, the content of the natural rubber per 100 parts by mass of the diene rubber is WN parts by mass. The content WN of the natural rubber is a remainder of 100 parts by mass of the diene rubber, excluding the emulsion-polymerized styrene-butadiene rubber and the butadiene rubber. The upper limit of the content WN of the natural rubber is 30 parts by mass, preferably 28 parts by mass, and more preferably 26 parts by mass. Furthermore, the lower limit of the content WN of the natural rubber is preferably 6 parts by mass, more preferably 8 parts by mass, and even more preferably 10 parts by mass. Furthermore, when the content of the natural rubber is greater than 30 parts by mass, wet grip performance is deteriorated.

The rubber composition for tires according to an embodiment of the present technology contains the silica, and therefore can enhance the behavior of dynamic visco-elasticity, which is an indicator for a heat build-up and wet grip performance. The type of the silica may be any silica that is regularly used in rubber compositions for a tire. Examples thereof include wet method silica, dry method silica, and surface treated silica. Such silica can be appropriately selected for use from commercially available silicas.

Furthermore, for the silica, the CTAB specific surface area is preferably from 120 to 180 $m^2/g$, and more preferably from 140 to 170 $m^2/g$. When the CTAB specific surface area of the silica is less than 120 $m^2/g$, wet performance is deteriorated. Furthermore, when the CTAB specific surface area of the silica is greater than 180 $m^2/g$, an effect of reducing a heat build-up cannot be sufficiently achieved. In the present specification, the CTAB specific surface area of the silica is measured in accordance with JIS K 6217-3.

In the rubber composition for a tire according to an embodiment of the present technology, the compounded amount WS of the silica has a specific relationship with the compounded amount WN of the natural rubber. That is, the ratio (WN/WS) of the compounded amount WN of the natural rubber to the compounded amount WS of the silica is from 0.4 to 1.0, and preferably from 0.5 to 0.8. When the ratio of the compounded amount of the natural rubber to the compounded amount of the silica (WN/WS) is less than 0.4, viscosity becomes greater, and processability is deteriorated. Furthermore, wet grip performance and wear resistance tend to be deteriorated. When the ratio of the compounded amounts (WN/WS) is greater than 1.0, wet grip performance is deteriorated. Furthermore, the viscosity becomes greater, and the processability tends to be deteriorated. Note that the compounded amount WS of the silica has a specific relationship with the compounded amount WT of the aromatic modified terpene resin as described below.

The silica can be blended together with another filler besides the silica. Examples of the other filler include carbon black, clay, calcium carbonate, aluminum hydroxide, talc, and mica. Among these, carbon black is preferable. Blending the carbon black can enhance the strength of the rubber composition, and wear resistance and cut resistance. A single type of or a combination of a plurality of types of these other fillers can be used.

The compounded amount of the fillers containing the silica is preferably from 50 to 120 parts by mass, more preferably from 55 to 110 parts by mass, and even more preferably from 60 to 90 parts by mass, per 100 parts by mass of the diene rubber. When the compounded amount of the fillers is less than 50 parts by mass, wet grip performance tends to be deteriorated. Furthermore, when the compounded amount of the fillers is greater than 120 parts by mass, the heat build-up tends to be large.

The compounded amount of the silica is preferably 10 mass % or greater, and more preferably from 10 to 40 mass %, relative to the total amount of the fillers. When the compounded amount of the silica is less than 10 mass %, effects of enhancing wet grip performance and reducing the heat build-up cannot be sufficiently achieved.

Furthermore, blending a silane coupling agent together with the silica is preferable from the perspective of enhancing the dispersibility of the silica in the diene rubber. The compounded amount of the silane coupling agent is preferably from 3 to 15 mass %, and more preferably from 4 to 10 mass %, relative to the compounded amount of the silica. When the compounded amount of the silane coupling agent is less than 3 mass %, the dispersibility of the silica cannot be sufficiently enhanced. Furthermore, when the compounded amount of the silane coupling agent is greater than 15 mass %, the silane coupling agents aggregate and condense, and the desired effects cannot be obtained.

The type of silane coupling agent is not particularly limited, but a sulfur-containing silane coupling agent is preferable. Examples of the sulfur-containing silane coupling agent include bis-(3-triethoxysilylpropyl)tetrasulfide, bis-(3-triethoxysilylpropyl)disulfide, 3-trimethoxysilylpropyl benzothiazole tetrasulfide, γ-mercaptopropyl triethoxysilane, and 3-octanoylthiopropyl triethoxysilane.

Blending the aromatic modified terpene resin to the rubber composition for a tire according to an embodiment of the present technology enhances wet grip performance. This is because the aromatic modified terpene resin enhances the dispersibility of the fillers, such as the silica and carbon black, and further enhances miscibility between the fillers and the diene rubber. Note that the effect of enhancing wet grip performance cannot be achieved or a characteristic(s) selected from processability, performance on snow, cut resistance, and wear resistance is deteriorated when another resin component is blended in place of the aromatic modified terpene resin. Examples of such another resin component include C5-C9-based petroleum resins, unmodified terpene resins, rosin-based resins, terpene phenol resins, hydrogenated terpene resins, phenol-based resins, and xylene-based resins.

As the aromatic modified terpene resin, an aromatic modified terpene resin having a softening point of preferably 100° C. or higher, and more preferably from 120 to 170° C., is preferably blended. When the softening point of the aromatic modified terpene resin is lower than 100° C., the effect of enhancing wet performance is less likely to be sufficiently achieved. In the present specification, the softening point of the aromatic modified terpene resin is measured in accordance with JIS (Japan Industrial Standard) K 6220-1 (ring and ball method).

As the compounded amount of the aromatic modified terpene resin, when the compounded amount of the silica is WS parts by mass, and when the compounded amount of the aromatic modified terpene resin is WT parts by mass, the ratio of these (WS/WT) is from 2.0 to 5.0, and preferably from 3.0 to 4.0. When the ratio of the compounded amount of the silica to the compounded amount of the aromatic modified terpene resin (WS/WT) is less than 2.0, performance on snow is deteriorated as well as wear resistance is deteriorated. Furthermore, the heat build-up becomes large. When the ratio of the compounded amounts (WS/WT) is greater than 5.0, wear resistance is deteriorated.

In the present technology, as the aromatic modified terpene resin, an aromatic modified terpene resin obtained by polymerizing a terpene, such as α-pinene, β-pinene, dipentene, and limonene, and at least one aromatic compound selected from the group consisting of styrene, α-methylstyrene, and vinyl toluene, is preferably used.

The rubber composition for a tire according to an embodiment of the present technology contains an appropriate amount of oil. Examples of the oil include oils that are typically contained in rubber compositions for a tire, such as aroma oil and process oil, and oil-extending components that are added to emulsion-polymerized styrene-butadiene rubbers. The compounded amount of the oil in the present specification refers to the total amount of the extender oil contained in a diene rubber, such as an emulsion-polymerized styrene-butadiene rubber, and the oil component that is added later. The compounded amount of the oil is decided so that the total amount of the oil and the aromatic modified terpene resin is preferably less than 50 parts by mass, more preferably less than 45 parts by mass, and even more preferably less than 40 parts by mass, per 100 parts by mass of the diene rubber. Furthermore, for the total amount of the oil and the aromatic modified terpene resin, the lower limit is preferably 10 parts by mass or greater, more preferably 15 parts by mass or greater, and even more preferably 25 parts by mass or greater. The rubber composition with the total amount of the aromatic modified terpene resin and the oil being within such a range can achieve high levels of performance on snow and wear resistance in a compatible manner.

In the rubber composition for a tire according to an embodiment of the present technology, the glass transition temperature of the diene rubber formed from the emulsion-polymerized styrene-butadiene rubber, the butadiene rubber, and the natural rubber (hereinafter, also referred to as "polymer Tg") is preferably from −85 to −55° C., and more preferably from −75 to −65° C. When the polymer Tg is higher than −55° C., performance on snow and wear resistance tend to be deteriorated. When the polymer Tg is lower than −85° C., wet grip performance tends to be deteriorated. In the present specification, the polymer Tg is the total number of values obtained by multiplying glass transition temperatures (Tg) of the emulsion-polymerized styrene-butadiene rubber, the butadiene rubber, and the natural rubber by mass fractions of the emulsion-polymerized styrene-butadiene rubber, the butadiene rubber, and the natural rubber.

Furthermore, the glass transition temperature of the rubber composition for a tire (hereinafter, also referred to as "compound Tg") is preferably from −80 to −50° C., and more preferably from −70 to −60° C. When the compound Tg is higher than −50° C., performance on snow and wear resistance tend to be deteriorated. Furthermore, when the compound Tg is lower than −80° C., wet grip performance tends to be deteriorated. In the present specification, the compound Tg is a total value obtained by multiplying glass transition temperatures (Tg) of the emulsion-polymerized styrene-butadiene rubber, the butadiene rubber, the natural rubber, the aromatic modified terpene resin, and the oil by the mass fractions of the emulsion-polymerized styrene-butadiene rubber, the butadiene rubber, the natural rubber, the aromatic modified terpene resin, and the oil.

The rubber composition for a tire according to an embodiment of the present technology can also contain various types of additives that are commonly used in rubber compositions, such as vulcanization and crosslinking agents, anti-aging agents, and plasticizers. These additives may be kneaded according to any common method to form a rubber composition and may be used in vulcanization or crosslinking. The compounded amount of these additives may be any known quantity, as long as the present technology is not impaired. The rubber composition for a tire can be produced by mixing each of the components described above using a commonly used rubber kneading machine such as a Banbury mixer, a kneader, and a roll.

The rubber composition for a tire according to an embodiment of the present technology can constitute a tread portion or a sidewall portion of a pneumatic tire. This rubber composition for a tire is preferably used for at least one portion selected from these portions. Among these, the rubber composition preferably constitutes a tread portion. A pneumatic tire using the rubber composition for a tire according to an embodiment of the present technology in these portions can enhance performance on snow, cut resistance, and wear resistance equal to or beyond conventional levels while achieving excellent wet grip performance. Furthermore, because production is performed by using the rubber composition for a tire having excellent processability, the tires having high quality wet grip performance, performance on snow, cut resistance, and wear resistance can be obtained in a stable manner.

A pneumatic tire that includes the rubber composition for a tire described above in a tread portion or a sidewall portion is preferably a pneumatic tire for sport utility vehicles (SUV) and/or light trucks or a pneumatic tire for all seasons. The pneumatic tire according to an embodiment of the present technology can enhance wet grip performance and performance on snow equal to or beyond conventional levels and reduce a heat build-up.

The present technology is further described below by examples. However, the scope of the present technology is not limited to these examples.

Example

Each of the 26 types of rubber compositions (Examples 1 to 10, Standard Example, and Comparative Examples 1 to 15) was prepared according to the formulations shown in Tables 1 to 3 with the compounding agents shown in Table 4 used as common components. With the exception of the sulfur and the vulcanization accelerators, the components were weighed and kneaded in a 16-L Banbury mixer for 5 minutes. The mixture was then discharged and cooled at room temperature. This was supplied to an open roll, and the sulfur and the vulcanization accelerators were then added and mixed to prepare a rubber composition for a tire. In Tables 1 and 2, because the emulsion-polymerized styrene-butadiene rubbers E-SBR-1 and -2, and the solution-polymerized styrene-butadiene rubber S-SBR contain oil-extending components, the net compounded amounts as the SBRs were also written in parentheses. In Tables 1 to 3, the compounded amounts of the natural rubber, the silica, and the aromatic modified terpene resin were shown respectively as WN, WS, and WT, and the mass ratios (WN/WS) and (WS/WT) were shown. Furthermore, the total amount of the oil component and the resin component was calculated and shown. The compounding agent shown in Table 4 shows the compounded amount (part by mass) per 100 parts by mass of the diene rubber shown in Tables 1 to 3.

The Mooney viscosity of each of the obtained 26 types of the rubber compositions was measured by the following method. Furthermore, by using each of the obtained 26 types of the rubber compositions, a vulcanized rubber sheet was prepared by vulcanizing in a mold having a predetermined shape at 160° C. for 20 minutes. The dynamic visco-elasticity was measured by the following method and used as an indicator for wet grip performance and performance on snow. Furthermore, cut resistance and wear resistance were evaluated by the following method.

Mooney Viscosity

The Mooney viscosity of the obtained rubber composition was measured in accordance with JIS K 6300-1:2001 using an L-type rotor in a Mooney viscometer under the conditions of a preheating time of 1 minute, a rotor rotation time of 4 minutes, and 100° C. The obtained results are shown in rows of "Processability" in Tables 1 to 3 as index values with the reciprocal of the value of Standard Example being defined as the index value of 100. A greater index value indicates lower Mooney viscosity and excellent processability.

Dynamic visco-elasticity; 0° C. tan δ, and E' at −10° C.

Using a viscoelastic spectrometer, available from Toyo Seiki Seisaku-sho, Ltd., the dynamic visco-elasticity of the obtained vulcanized rubber sheet was measured at an initial strain of 10%, an amplitude of +2%, and a frequency of 20 Hz, and the tan δ at the temperature of 0° C. and E' at ±10° C. were determined. The obtained results for tan δ (0° C.) are shown in rows of "Wet grip performance" in Tables 1 to 3 as index values with the value of Standard Example being defined as the index value of 100. A greater index value of "wet grip performance" indicates a greater tan δ (0° C.) and superior wet grip performance when a tire is formed. The index value of the wet grip performance of 98 or higher is considered as acceptable level. Furthermore, the obtained results for E' (−10° C.) are shown in rows of "Performance on snow" in Tables 1 to 3 as index values with the reciprocal of the value of Standard Example being defined as the index value of 100. A greater index value of "performance on snow" indicates a smaller E' (−10° C.) and excellent performance on snow when a tire is formed.

Cut Resistance

A dumbbell-shaped JIS No. 3 test piece was produced by using the obtained vulcanized rubber sheet in accordance with JIS K 6251, and tensile test was performed at room temperature (20° C.) at a tensile test speed of 500 mm/min to measure the tensile strength at break. The obtained results are shown in rows of "Cut resistance performance" in Tables 1 to 3 as index values with the value of Standard Example being defined as the index value of 100. A larger index value indicates a higher tensile strength at break and excellent cut resistance.

Wear Resistance

The amount of wear of each of the obtained vulcanized rubber sheets was measured by using a Lambourn abrasion test machine (available from Iwamoto Seisakusho Co. Ltd.) in accordance with JIS K 6264 under the following conditions: a temperature of 20° C., a load of 49 N, a slip rate of 25%, and a time of 4 minutes. The obtained results are shown in rows of "Wear resistance performance" in Tables 1 to 3 as the index values with the reciprocal of the value of Standard Example being defined as an index value of 100. A larger index value indicates a higher wear resistance and excellent tire durability.

TABLE 1

|  |  | Standard Example | Example 1 | Example 2 | Example 3 | Example 4 |
|---|---|---|---|---|---|---|
| BR | Part by mass | 35 | 35 | 35 | 35 | 35 |
| E-SBR-1 | Part by mass | 79.3 (57.7) | 75.6 (55) | 75.6 (55) | 75.6 (55) | 75.6 (55) |
| E-SBR-2 | Part by mass | 10.0 (7.3) |  |  |  |  |
| NR (WN) | Part by mass |  | 10 | 10 | 10 | 10 |
| Carbon black | Part by mass | 60 | 60 | 40 | 65 | 65 |
| Silica-1 (WS) | Part by mass | 20 | 20 | 20 | 25 | 15 |
| Silica-2 (WS) | Part by mass |  |  |  |  |  |
| Coupling agent | Part by mass | 0.5 | 0.5 | 0.5 | 0.5 | 0.5 |
| Aromatic modified terpene resin-1 (WT) | Part by mass | 20 | 5 | 5 | 5 | 5 |
| Process oil | Part by mass | 16 | 5 | 5 | 5 | 5 |
| Mass ratio (WN)/(WS) | — |  | 0.0 | 0.5 | 0.4 | 0.7 |
| Mass ratio (WS)/(WT) | — |  | 1.0 | 4.0 | 4.0 | 5.0 | 3.0 |
| Total amount of oil component and resin component | (part by mass) | (60.3) | (30.6) | (30.6) | (30.6) | (30.6) |
| Processability | Index value | 100 | 101 | 106 | 100 | 102 |
| Wet grip performance | Index value | 100 | 99 | 98 | 101 | 100 |
| Performance on snow | Index value | 100 | 103 | 104 | 102 | 101 |
| Cut resistance performance | Index value | 100 | 103 | 101 | 102 | 104 |

TABLE 1-continued

| | | | | | | |
|---|---|---|---|---|---|---|
| Wear resistance performance | Index value | 100 | 104 | 102 | 103 | 105 |

| | | Example 5 | Example 6 | Example 7 | Example 8 |
|---|---|---|---|---|---|
| BR | Part by mass | 35 | 25 | 35 | 35 |
| E-SBR-1 | Part by mass | 75.6 (55) | 75.6 (55) | 75.6 (55) | 75.6 (55) |
| E-SBR-2 | Part by mass | | | | |
| NR (WN) | Part by mass | 10 | 20 | 10 | 10 |
| Carbon black | Part by mass | 69 | 60 | 60 | 60 |
| Silica-1 (WS) | Part by mass | 11 | 20 | 20 | |
| Silica-2 (WS) | Part by mass | | | | 20 |
| Coupling agent | Part by mass | 0.5 | 0.5 | 0.5 | 0.5 |
| Aromatic modified terpene resin-1 (WT) | Part by mass | 5 | 5 | 8 | 5 |
| Process oil | Part by mass | 5 | 5 | 3 | 5 |
| Mass ratio (WN)/(WS) | — | 0.9 | 1.0 | 0.5 | 0.5 |
| Mass ratio (WS)/(WT) | — | 2.2 | 4.0 | 2.5 | 4.0 |
| Total amount of oil component and resin component | (part by mass) | (30.6) | (30.6) | (31.6) | (30.6) |
| Processability | Index value | 103 | 99 | 100 | 102 |
| Wet grip performance | Index value | 101 | 100 | 101 | 98 |
| Performance on snow | Index value | 100 | 102 | 102 | 102 |
| Cut resistance performance | Index value | 104 | 104 | 104 | 102 |
| Wear resistance performance | Index value | 106 | 104 | 103 | 103 |

TABLE 2

| | | Example 9 | Example 10 | Comparative Example 1 | Comparative Example 2 |
|---|---|---|---|---|---|
| BR | Part by mass | 35 | 35 | 45 | 42 |
| E-SBR-1 | Part by mass | 75.6 (55) | 75.6 (55) | 61.9 (45) | 68.7 (50) |
| E-SBR-2 | Part by mass | | | | |
| NR (WN) | Part by mass | 10 | 10 | 10 | 8 |
| S-SBR | Part by mass | | | | |
| Carbon black | Part by mass | 60 | 60 | 60 | 60 |
| Silica-1 (WS) | Part by mass | 20 | 20 | 20 | 20 |
| Coupling agent | Part by mass | 0.5 | 0.5 | 0.5 | 0.5 |
| Aromatic modified terpene resin-1 (WT) | Part by mass | | 5 | 5 | 5 |
| Aromatic modified terpene resin-2 (WT) | Part by mass | 5 | | | |
| Process oil | Part by mass | 5 | 25 | 5 | 5 |
| Mass ratio (WN)/(WS) | — | 0.5 | 0.5 | 0.5 | 0.4 |
| Mass ratio (WS)/(WT) | — | 4.0 | 4.0 | 4.0 | 4.0 |
| Total amount of oil component and resin component | (part by mass) | (30.6) | (50.6) | (26.9) | (28.7) |
| Processability | Index value | 100 | 106 | 99 | 100 |
| Wet grip performance | Index value | 98 | 99 | 95 | 96 |
| Performance on snow | Index value | 104 | 105 | 103 | 102 |
| Cut resistance performance | Index value | 103 | 104 | 99 | 98 |
| Wear resistance performance | Index value | 105 | 100 | 105 | 104 |

| | | Comparative Example 3 | Comparative Example 4 | Comparative Example 5 | Comparative Example 6 |
|---|---|---|---|---|---|
| BR | Part by mass | 15 | 33 | 35 | 35 |
| E-SBR-1 | Part by mass | 103.1 (75) | 89.4 (65) | | |
| E-SBR-2 | Part by mass | | | 75.6 (55) | |
| NR (WN) | Part by mass | 10 | | 10 | 10 |
| S-SBR | Part by mass | | | | 75.6 (55) |
| Carbon black | Part by mass | 60 | 60 | 60 | 60 |
| Silica-1 (WS) | Part by mass | 20 | 20 | 20 | 20 |
| Coupling agent | Part by mass | 0.5 | 0.5 | 0.5 | 0.5 |
| Aromatic modified terpene resin-1 (WT) | Part by mass | 5 | 5 | 5 | 5 |
| Aromatic modified terpene resin-2 (WT) | Part by mass | | | | |

TABLE 2-continued

| | | | | | |
|---|---|---|---|---|---|
| Process oil | Part by mass | 5 | 5 | 5 | 5 |
| Mass ratio (WN)/(WS) | — | 0.5 | 0.0 | 0.5 | 0.5 |
| Mass ratio (WS)/(WT) | — | 4.0 | 4.0 | 4.0 | 4.0 |
| Total amount of oil component and resin component | (part by mass) | (38.1) | (34.4) | (30.6) | (30.6) |
| Processability | Index value | 102 | 99 | 98 | 90 |
| Wet grip performance | Index value | 104 | 102 | 103 | 106 |
| Performance on snow | Index value | 95 | 98 | 96 | 100 |
| Cut resistance performance | Index value | 105 | 98 | 100 | 101 |
| Wear resistance performance | Index value | 96 | 97 | 99 | 100 |

TABLE 3

| | | Comparative Example 7 | Comparative Example 8 | Comparative Example 9 | Comparative Example 10 |
|---|---|---|---|---|---|
| BR | Part by mass | 35 | 39 | 40 | 35 |
| E-SBR-1 | Part by mass | 61.9 (45) | 68.7 (50) | 75.6 (55) | 75.6 (55) |
| NR (WN) | Part by mass | 20 | 11 | 5 | 10 |
| S-SBR | Part by mass | | | | |
| Carbon black | Part by mass | 60 | 60 | 60 | 60 |
| Silica-1 (WS) | Part by mass | 20 | 10 | 20 | 20 |
| Coupling agent | Part by mass | 0.5 | 0.5 | 0.5 | 0.5 |
| Aromatic modified terpene resin-1 (WT) | Part by mass | 5 | 5 | 5 | 3.5 |
| C5-C9-based petroleum resin | Part by mass | | | | |
| Unmodified terpene resin | Part by mass | | | | |
| Terpene phenol resin | Part by mass | | | | |
| Process oil | Part by mass | 5 | 5 | 5 | 5 |
| Mass ratio (WN)/(WS) | — | 1.0 | 1.1 | 0.25 | 0.5 |
| Mass ratio (WS)/(WT) | — | 4.0 | 2.0 | 4.0 | 5.7 |
| Total amount of oil component and resin component | (part by mass) | (26.9) | (28.7) | (30.6) | (29.1) |
| Processability | Index value | 102 | 98 | 96 | 98 |
| Wet grip performance | Index value | 97 | 97 | 98 | 97 |
| Performance on snow | Index value | 102 | 101 | 101 | 102 |
| Cut resistance performance | Index value | 102 | 105 | 99 | 98 |
| Wear resistance performance | Index value | 102 | 104 | 98 | 97 |

| | | Comparative Example 11 | Comparative Example 12 | Comparative Example 13 | Comparative Example 14 | Comparative Example 15 |
|---|---|---|---|---|---|---|
| BR | Part by mass | 35 | 35 | 35 | 35 | 37.8 |
| E-SBR-1 | Part by mass | 75.6 (55) | 75.6 (55) | 75.6 (55) | 75.6 (55) | 75.6 (55) |
| NR (WN) | Part by mass | 10 | 10 | 10 | 10 | 7.2 |
| S-SBR | Part by mass | | | | | |
| Carbon black | Part by mass | 60 | 60 | 60 | 60 | 60 |
| Silica-1 (WS) | Part by mass | 20 | 20 | 20 | 20 | 20 |
| Coupling agent | Part by mass | 0.5 | 0.5 | 0.5 | 0.5 | 0.5 |
| Aromatic modified terpene resin-1 (WT) | Part by mass | 15 | | | | 5 |
| C5-C9-based petroleum resin | Part by mass | | 5 | | | |

TABLE 3-continued

| | | | | | | |
|---|---|---|---|---|---|---|
| Unmodified terpene resin | Part by mass | | | 5 | | |
| Terpene phenol resin | Part by mass | | | | 5 | |
| Process oil | Part by mass | 5 | 5 | 5 | 5 | 5 |
| Mass ratio (WN)/(WS) | — | 0.5 | 0.5 | 0.5 | 0.5 | 0.36 |
| Mass ratio (WS)/(WT) | — | 1.3 | — | — | — | 4.0 |
| Total amount of oil component and resin component | (part by mass) | (40.6) | (30.6) | (30.6) | (30.6) | (30.6) |
| Processability | Index value | 101 | 101 | 102 | 102 | 98 |
| Wet grip performance | Index value | 107 | 99 | 95 | 94 | 98 |
| Performance on snow | Index value | 96 | 97 | 103 | 96 | 102 |
| Cut resistance performance | Index value | 97 | 98 | 103 | 103 | 99 |
| Wear resistance performance | Index value | 96 | 99 | 104 | 104 | 100 |

Types of raw materials used in Tables 1 to 3 are as described below.

BR: Butadiene rubber; Nipol BR1220, available from Zeon Corporation

E-SBR-1: Emulsion-polymerized styrene-butadiene rubber; Nipol 1723, available from Zeon Corporation; bonded styrene content: 23.4 mass %; 37.5 parts by mass of an oil-extending component was contained per 100 parts by mass of the styrene-butadiene rubber.

E-SBR-2: Emulsion-polymerized styrene-butadiene rubber; Nipol 1739, available from Zeon Corporation; bonded styrene content: 38.9 mass %; 37.5 parts by mass of an oil-extending component was contained per 100 parts by mass of the styrene-butadiene rubber.

NR: Natural rubber; TSR20

S-SBR: Solution-polymerized styrene-butadiene rubber; Nipol NS460, available from Zeon Corporation; bonded styrene content: 26.1 mass %; 37.5 parts by mass of an oil-extending component was contained per 100 parts by mass of the styrene-butadiene rubber.

Carbon black: Show Black 339, available from Cabot Japan K.K.

Silica-1: Zeosil 1165MP, available from Rhodia (CTAB specific surface area: 155 m$^2$/g)

Silica-2: Zeosil 115GR, available from Rhodia (CTAB specific surface area: 110 m$^2$/g)

Coupling agent: Sulfur-containing silane coupling agent; Si69, available from Evonik Degussa Aromatic modified terpene resin-1: YS Resin TO-125, available from Yasuhara Chemical Co., Ltd.; softening point: 125° C.

Aromatic modified terpene resin-2: YS Resin TO-85, available from Yasuhara Chemical Co., Ltd.; softening point: 85° C.

C5-C9-based petroleum resin: Petrotack 120V, available from Tosoh Corporation

Unmodified terpene resin: YS Resin PX1000, available from Yasuhara Chemical Co., Ltd.

Terpene phenol resin: YS Polyster N125, available from Yasuhara Chemical Co., Ltd.

Process oil: Extract No. 4S, available from Showa Shell Sekiyu K.K.

TABLE 4

Common formulation for compounding agents of rubber composition

| | |
|---|---|
| Stearic acid | 2.5 parts by mass |
| Zinc oxide | 2.5 parts by mass |
| Anti-aging agent | 2.0 parts by mass |
| Vulcanization accelerator-1 | 1.7 parts by mass |
| Vulcanization accelerator-2 | 0.4 parts by mass |
| Sulfur | 1.4 parts by mass |

The types of raw materials used in Table 4 are described below.
Stearic acid: Beads stearic acid, available from NOF Corporation
Zinc oxide: Zinc Oxide III (available from Seido Chemical Industry Co., Ltd.)
Anti-aging agent: 6PPD available from Flexsys
Vulcanization accelerator-1: NOCCELER CZ-G, available from Ouchi Shinko Chemical Industrial Co., Ltd.
Vulcanization accelerator-2: Soxinol D-G, available from Sumitomo Chemical Co., Ltd.
Sulfur: "Golden Flower" oil-treated sulfur powder, available from Tsurumi Chemical Industry, Co., Ltd.

As is clear from the results of Tables 1 and 2, all of the rubber compositions for a tire of Examples 1 to 10 can maintain or enhance performance on snow, cut resistance, and wear resistance while maintaining wet grip performance, compared to those of the rubber compositions for a tire of Standard Example. Furthermore, the Mooney viscosity of each of the rubber compositions for a tire is small, and excellent processability is achieved.

On the other hand, as is clear from the results of Table 2, the rubber composition for a tire of Comparative Example 1 exhibits poor wet grip performance because the content of the butadiene rubber is greater than 40 parts by mass, and the content of the emulsion-polymerized styrene-butadiene rubber having the bonded styrene content of 30 mass % or less is less than 50 parts by mass.

The rubber composition for a tire of Comparative Example 2 exhibits poor wet grip performance because the content of the butadiene rubber is greater than 40 parts by mass.

The rubber composition for a tire of Comparative Example 3 exhibits poor performance on snow and poor wear resistance because the content of the butadiene rubber is less than 20 parts by mass.

The rubber composition for a tire of Comparative Example 4 exhibits poor performance on snow, poor cut resistance, and poor wear resistance because no natural rubber is contained.

The rubber composition for a tire of Comparative Example 5 exhibits poor processability and poor performance on snow because the emulsion-polymerized styrene-butadiene rubber E-SBR-2 having the bonded styrene content of greater than 30 mass % is blended in place of the emulsion-polymerized styrene-butadiene rubber E-SBR-1 having the bonded styrene content of 30 mass % or less.

The rubber composition for a tire of Comparative Example 6 exhibits poor processability because the solution-polymerized styrene-butadiene rubber S-SBR having the bonded styrene content of 30 mass % or less is blended in place of the emulsion-polymerized styrene-butadiene rubber E-SBR-1 having the bonded styrene content of 30 mass % or less.

As is clear from the results of Table 3, the rubber composition for a tire of Comparative Example 7 exhibits poor wet grip performance because the content of the emulsion-polymerized styrene-butadiene rubber E-SBR-1 having the bonded styrene content of 30 mass % or less is less than 50 parts by mass.

The rubber composition for a tire of Comparative Example 8 exhibits poor processability and poor wet grip performance because the mass ratio of the natural rubber to the silica (WN/WS) is greater than 1.0.

The rubber composition for a tire of Comparative Example 9 exhibits poor processability, poor wet grip performance, poor cut resistance performance, and poor wear resistance because the mass ratio of the natural rubber to the silica (WN/WS) is less than 0.4.

The rubber composition for a tire of Comparative Example 10 exhibits poor processability, poor wet grip performance, poor cut resistance performance, and poor wear resistance because the mass ratio of the silica to the aromatic modified terpene resin (WS/WT) is greater than 5.0.

The rubber composition for a tire of Comparative Example 11 exhibits poor performance on snow, poor cut resistance performance, and poor wear resistance because the mass ratio of the butadiene rubber to the aromatic modified terpene resin (WB/WT) is less than 2.0.

The rubber composition for a tire of Comparative Example 12 exhibits poor wet grip performance, poor performance on snow, poor cut resistance performance, and poor wear resistance because the C5-C9-based petroleum resin is blended in place of the aromatic modified terpene resin.

The rubber composition for a tire of Comparative Example 13 exhibits poor wet grip performance because the unmodified terpene resin is blended in place of the aromatic modified terpene resin.

The rubber composition for a tire of Comparative Example 14 exhibits poor wet grip performance and poor performance on snow because the terpene phenol resin is blended in place of the aromatic modified terpene resin.

The rubber composition for a tire of Comparative Example 15 exhibits poor processability, poor wet grip performance, and poor cut resistance performance because the mass ratio of the natural rubber to the silica (WN/WS) is less than 0.4.

The invention claimed is:

1. A rubber composition for a tire, the rubber composition comprising:
   per 100 parts by mass of a diene rubber containing 50 parts by mass or greater of an emulsion-polymerized styrene-butadiene rubber having a bonded styrene content of 30 mass % or less, from 28 to 40 parts by mass of a butadiene rubber, and WN parts by mass of a natural rubber,
   WT parts by mass of an aromatic modified terpene resin, and
   WS parts by mass of a silica;
   a ratio (WN/WS) of a compounded amount of the natural rubber (WN) to a compounded amount of the silica (WS) being from 0.4 to 1.0; and
   a ratio (WS/WT) of the compounded amount of the silica (WS) to a compounded amount of the aromatic modified terpene resin (WT) being from 2.0 to 5.0.

2. The rubber composition for a tire according to claim 1, further comprising from 50 to 120 parts by mass of a filler per 100 parts by mass of the diene rubber, the filler containing 10 mass % or greater of the silica, and a CTAB specific surface area of the silica being from 120 to 180 $m^2/g$.

3. A pneumatic tire comprising the rubber composition for a tire described in claim 1.

4. A pneumatic tire comprising the rubber composition for a tire described in claim 2.

* * * * *